E. E. WETZEL.
MILLING TOOL.
APPLICATION FILED NOV. 10, 1908.

955,029.

Patented Apr. 12, 1910.

WITNESSES:
F. W. Downer
T. B. Moodey

INVENTOR
Elmer E. Wetzel

UNITED STATES PATENT OFFICE.

ELMER E. WETZEL, OF PAINESVILLE, OHIO.

MILLING-TOOL.

955,029.

Specification of Letters Patent.   Patented Apr. 12, 1910.

Application filed November 10, 1908.   Serial No. 461,987.

*To all whom it may concern:*

Be it known that I, ELMER E. WETZEL, a citizen of the United States, residing at Painesville, in the county of Lake and State of Ohio, have invented certain new and useful Improvements in Milling-Tools, of which the following is a specification.

This invention is a milling iron or tool having for its object to support heavy articles such as blocks of marble or granite in such manner that they can be easily moved or turned, and it comprises two square plates of steel which are connected to each other and which will rotate upon each other by means of ball bearings therebetween.

The invention is illustrated in the accompanying drawings in which—

Figure 1:
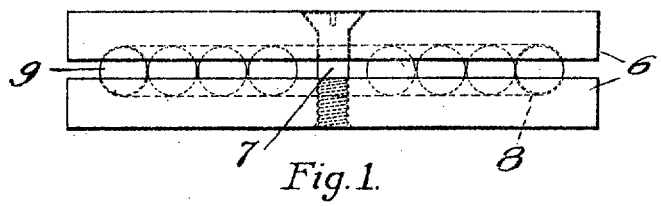
Figure 2:
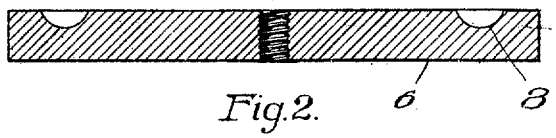
Figure 3:
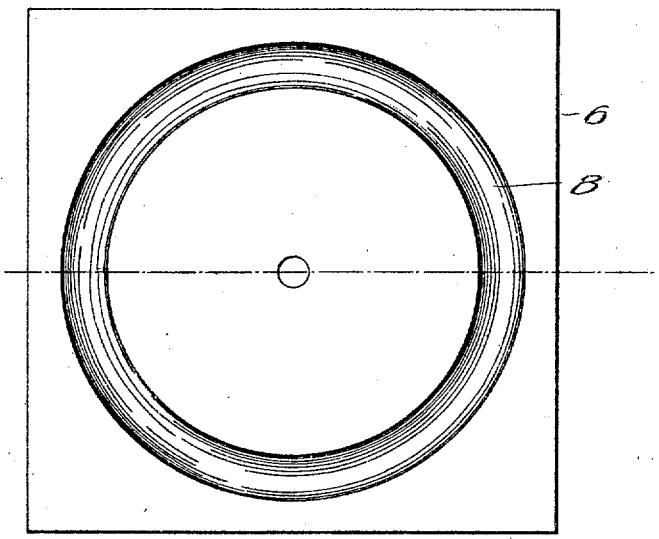
Figure 5:
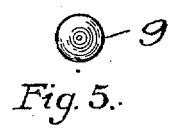
Figure 4:
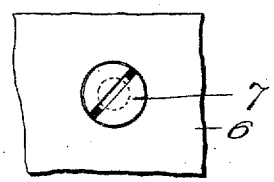

Figure 1 is a side elevation of the device; Fig. 2 is a cross section of the lower plate; Fig. 3 is a plan of one of the plates showing the groove in which the bearings run; Fig. 4 is a detail showing the head of the screw which holds the plates together; Fig. 5 is one of the bearing balls.

The device consists of two plates of machine steel indicated at 6 held together by a flat-headed pivot screw 7 which slips through the top plate and screws into the lower plate. The head of the screw when in position is slightly below the face of the plate so that the weight of the object to be turned does not rest on the screw. Each plate has a similar circular groove 8, and when the plates are assembled the grooves are opposite each other. Balls 9 run in the grooves and serve to space the plates apart. The plates are shown as square, but may be made in any other shape having straight edges. The square shape, or shape having straight edges is important and practically necessary, and circular plates would be unsatisfactory, for the reason that when the device is placed under a heavy stone or other object which has been tilted to allow the device to be slipped in under the same, the stone in being tilted backward to an upright position strikes the straight edge of the upper plate and is brought upon the upper plate without any trouble. Should a circular plate be used, and if the same were set slightly to one side of the center of weight of the object, in letting the object down upon the iron it would if the plates were circular tilt to the heaviest side, owing to the fact that the circular plate presents only one point of contact with the object, while a square or non circular block presents a straight edge which passes through the vertical plane of the center of weight and has points of contact with the object on each side of said plane, thus erecting the object even with the iron made to one side of the center of the object.

In use, the device is placed under the block or object which can then be easily revolved as desired. The ring of balls gives a firm support for the block or object placed on the iron, and one plate will turn with respect to the other to any desired position.

I claim:

A milling iron comprising a pair of plates pivotally connected together, said plates being portable, with flat exterior surfaces having straight edges and adapted to support heavy articles on either side thereof, and anti-friction bearings between the plates.

ELMER E. WETZEL.

Witnesses:
  WILLIS NOLAN,
  HARRY T. NOLAN.